DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 12

T883,018
OPTICAL BRIGHTENING AGENTS

Derek D. Chapman and John W. Gates, Jr., both of Kodak Park Division, Rochester, N.Y. 14650

Filed July 9, 1970, Ser. No. 53,701
**Int. Cl. G03c *1/92***
U.S. Cl. 96—82
No Drawing. 15 Pages Specification

Compounds having the structure:

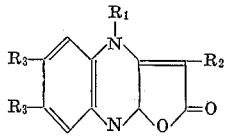

wherein each of $R_1$ and $R_3$ can be hydrogen; alkyl, including substituted alkyl; aryl, including substituted aryl, and $R_2$ is halogen; alkyl, including substituted alkyl; aryl, including substituted aryl, have been found to be optical brighteners, especially for photographic elements, for example, a photographic element comprising a photographic silver halide layer, photographic print materials and particularly for photographic color print materials. The brighteners are inert photographically and may be used without any deleterious effect in photographic silver halide emulsion layers, Baryta layers, backings, undercoats and other layers where the compounds can be employed advantageously. The brighteners may be dissolved in a dispersing solvent prior to incorporation into the photographic element. The brighteners can be present in a photographic layer in an amount of from about 2 to 10 mg. per square foot of surface. Although the optical brighteners of the invention have particular applicability to photographic elements, their use is not limited thereto. They may also be used, for instance, in lighting panels; in various types of plastic compositions, in inks, paints, and the like or in any application applied to a surface or in a film for the emission of visible light upon exposure to ultraviolet light.

Illustrative compounds useful as optical brighteners in accordance with the present invention are:

3-methylfuro(2,3-b)quinoxalin-2(4H)-one
3-phenylfuro(2,3-b)quinoxaline-2(4H)-one
3-methyl-4-n-octyl-furo(2,3-b)-2(4H)-one
3-methyl-4-n-octadecylfuro(2,3-b)quinoxalin-2(4H)-one
3-decylfuro(2,3-b)quinoxalin-2(4H)-one
2-methyl-3-decylfuro(2,3-b)quinoxalin-2(4H)-one.

The photographic silver halide emulsions and elements containing the optical brighteners can be chemically sensitized, e.g., with noble metal sensitizers alone or in combination with sulfur or selenium sensitizers. They can contain spectral sensitizers, incorporated color-forming couplers, incorporated developing agents, antifoggants, hardeners, plasticizers, coating aids, and other suitable photographic addenda, such as described in U.S. Pat. 3,297,446 (columns 4–9).